United States Patent [19]

Marendaz

[11] 3,956,609
[45] May 11, 1976

[54] PULSE GENERATOR FOR ELECTRO-EROSION MACHINING APPARATUS

[75] Inventor: Georges-André Marendaz, Meyrin, Geneva, Switzerland

[73] Assignee: Ateliers des Charmilles S.A., Geneva, Switzerland

[22] Filed: Aug. 19, 1974

[21] Appl. No.: 498,655

[30] Foreign Application Priority Data
Aug. 31, 1973 Switzerland.................... 12505/73

[52] U.S. Cl........................ 219/69 P; 219/69 C; 307/252 J; 307/270
[51] Int. Cl.²........................................ B23K 9/16
[58] Field of Search............. 219/69 P, 69 M, 69 C, 219/113, 10.77; 307/297, 252 J, 270; 321/43, 14

[56] References Cited
UNITED STATES PATENTS

| | | | |
|---|---|---|---|
| 3,485,987 | 12/1969 | Povteafield............... | 219/69 P |
| 3,485,990 | 12/1969 | Sennowitz.................. | 219/69 C |
| 3,585,491 | 6/1971 | Petersen..................... | 321/14 |
| 3,588,431 | 6/1971 | Pekelharing................ | 219/69 C |
| 3,599,017 | 8/1971 | Oakes......................... | 307/252 J |
| 3,825,715 | 7/1974 | Saito et al................... | 219/69 C |
| 3,832,510 | 8/1974 | Pfau et al.................... | 219/69 P |
| 3,843,864 | 10/1974 | Wohlbaugh.................. | 219/69 G |

*Primary Examiner*—Bruce A. Reynolds
*Attorney, Agent, or Firm*—Hauke, Patalidis & Dumont

[57] ABSTRACT

A pulse generator for an electro-erosion machining apparatus wherein electrical discharges occur at a machining zone formed between an electrode workpiece and an electrode tool, the pulse generator comprising a capacitor charged from a source of direct current through an inductance and a switch for discharging the capacitor through the primary of a transformer, the electrode tool and the workpiece being connected across the secondary of the transformer, the capacitor being charged at a predetermined current rate and being discharged when the voltage across the capacitor reaches a preset level.

6 Claims, 12 Drawing Figures

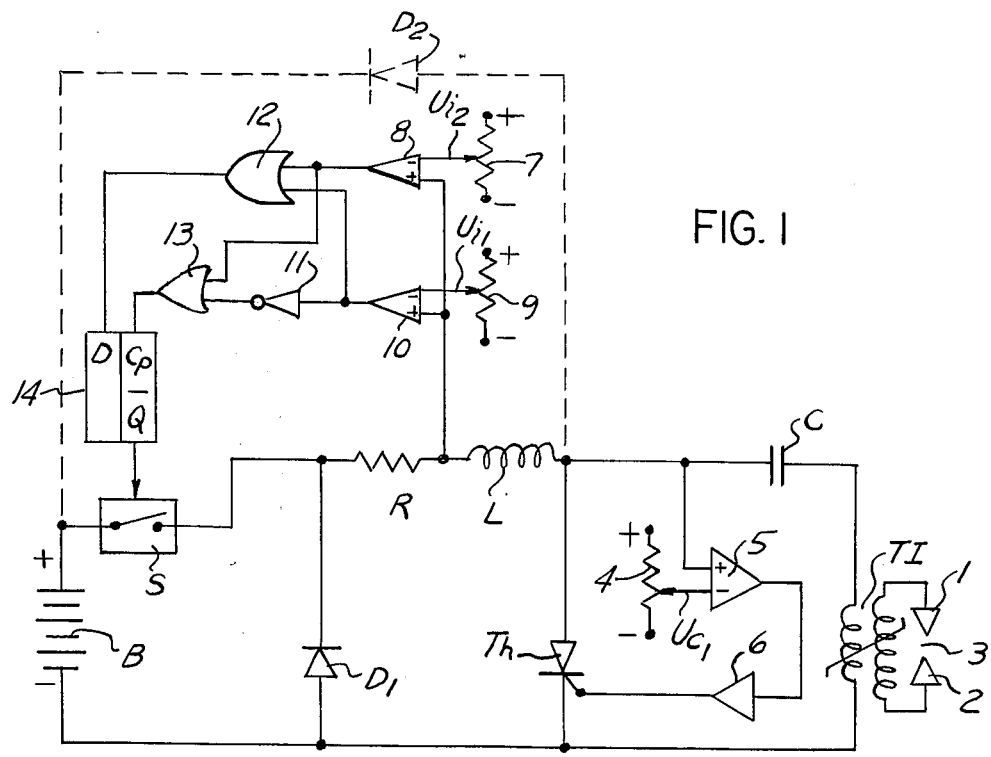
FIG. 1
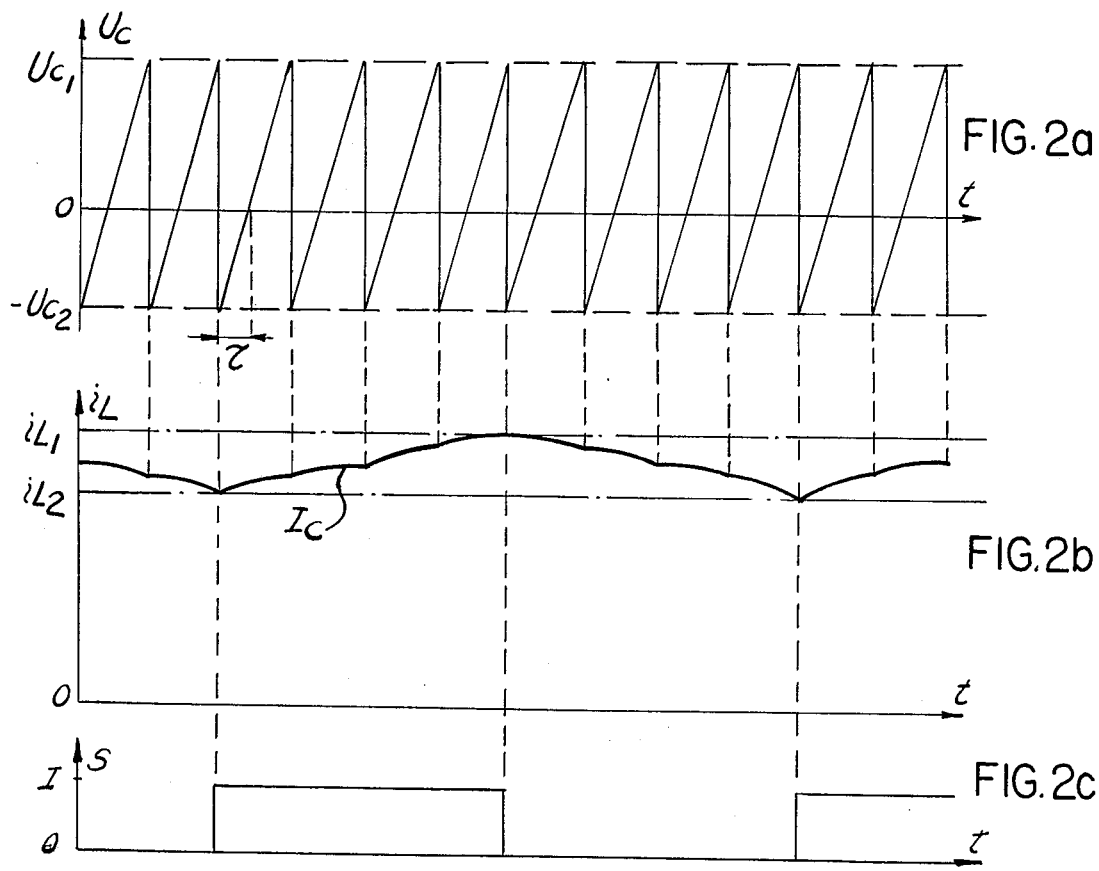
FIG. 2a
FIG. 2b
FIG. 2c

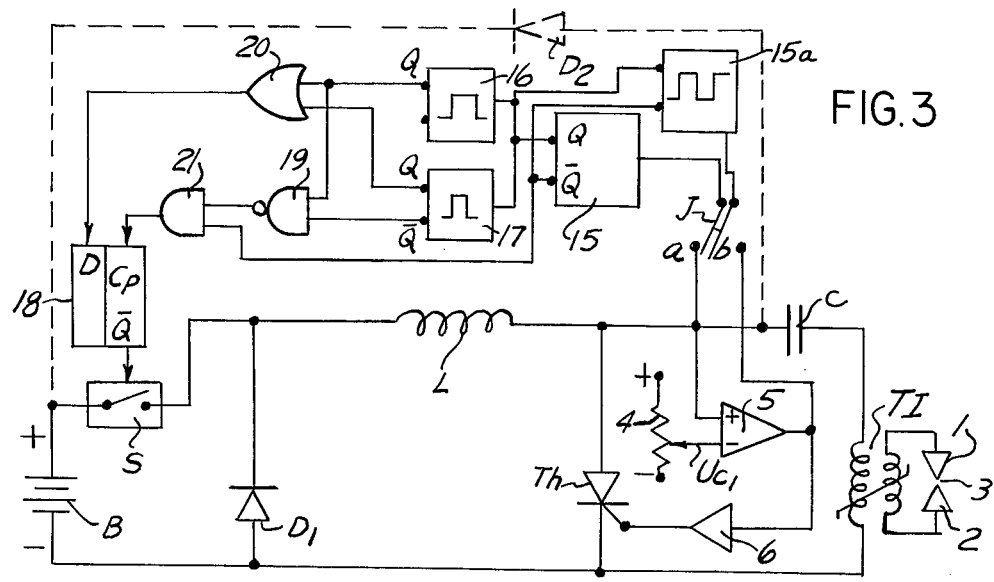
FIG. 3
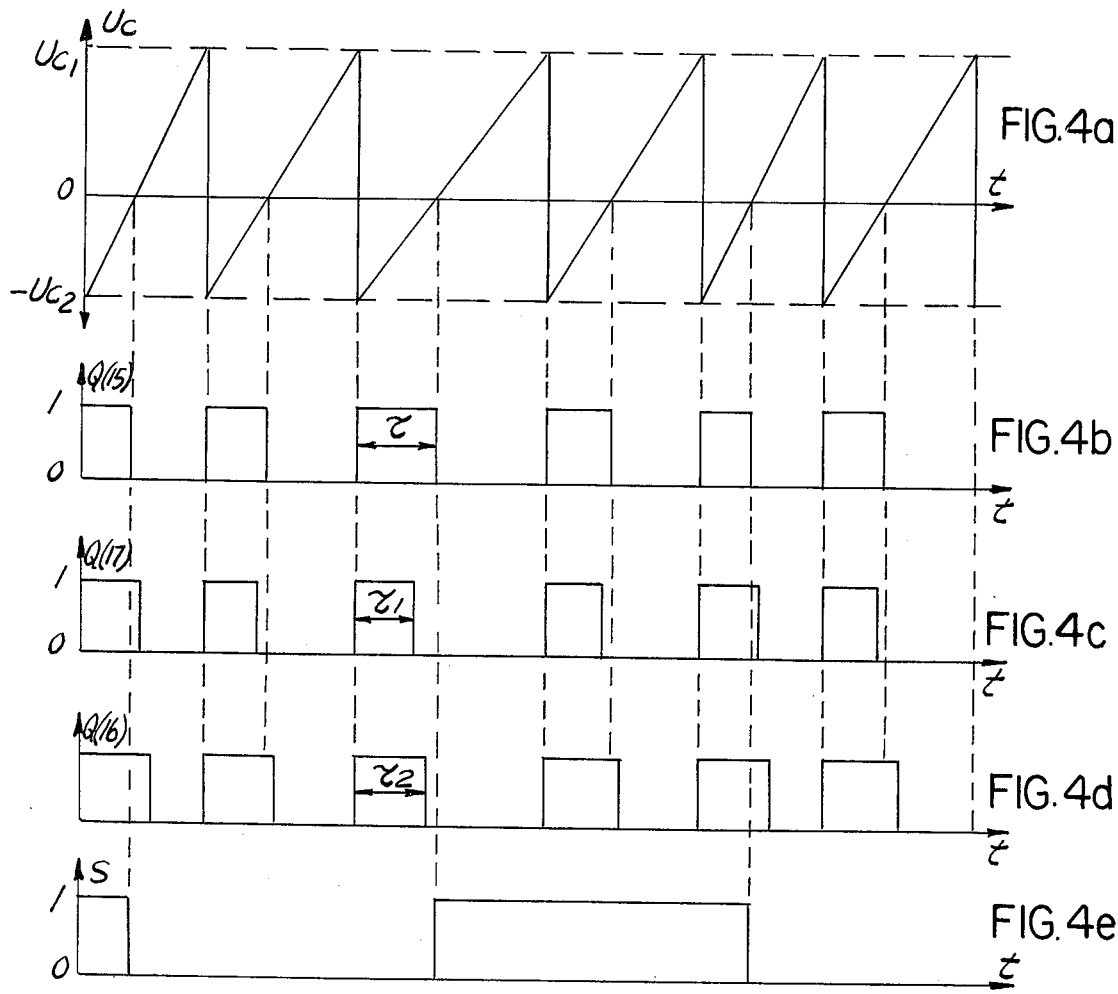
FIG. 4a
FIG. 4b
FIG. 4c
FIG. 4d
FIG. 4e

PULSE GENERATOR FOR ELECTRO-EROSION MACHINING APPARATUS

BACKGROUND OF THE INVENTION

The present invention relates to a pulse generator for electrical discharge machining, permitting to supply, at a high efficiency rate, short duration pulses to a machining zone between a workpiece an electrode tool, at a controllable voltage and frequency.

The present invention relates more particularly to a circuit for a pulse generator for electro-erosion machining providing electrical discharges between the electrode tool and the workpiece and which comprises a circuit including a capacitor connected across a DC power supply, the capacitor being charged from the DC power supply through an inductance connected in series, and at least one switching means for discharging the capacitor into a circuit comprising a pulse transformer, preferably of the saturable reactor type, connected to an electrical discharge circuit comprising the electrode tool and the workpiece.

Many circuits are known for providing current pulses by way of controlled discharge of a charged capacitor. In circuits where the capacitor is charged through a series inductance, it is well known that the maximum voltage across the capacitor may reach twice the voltage of the power supply, when the initial charge of the capacitor is equal to zero. Such an arrangement is disclosed in U.S. Pat. No. 2,835,785 which discloses several circuits connected in parallel for discharging a capacitor in a machining zone by means of a periodic control.

Another known circuit comprises in the discharge circuit of the capacitor a switching means, for example a thyristor, or a silicon controlled rectifier (SCR), which suppresses current inversion. In such cases, a fraction of the energy stored in the capacitor is not utilized in the discharge circuit and the voltage across the capacitor reaches a higher value at the end of each charge. U.S. Pat. Nos. 3,485,888 and 3,485,990 disclose such circuits.

However, although circuits of the type hereinbefore mentioned present advantages as far as permitting to obtain much higher discharge voltage than are obtained by more conventional circuits, they still present the disadvantage of supplying pulses having an energy level varying as a function of the conductivity of the discharge circuit. In addition, the energy level may also vary as a function of voltage variations across the charge circuit of the capacitor. The result is that the duration of voltage inversion across the thyristor terminals is not controllable.

It is known to regulate the voltage level of the electrical discharges by limiting or regulating the charge voltage of the capacitor to a predetermined value, for example by connecting a limiting or zener diode between the source and the capacitor. However, such an expedient is not applicable to the above mentioned circuits because it prevents the voltage across the inductance from reaching a zero value, and there results a progressive increase of the charge current and a progressive decrease of the time interval during which the voltage is inverted at the terminals of the thyristor. Stable operation of such a circuit cannot be obtained unless the average voltage of the charge circuit is lowered to a value which corresponds to the average voltage across the capacitor. By varying the ratio between the regulated voltage and the average voltage of the charge circuit the charge current of the capacitor can be controlled and, consequently, the duration during which the voltage is inverted across the thyristor terminals. Because this duration determines the switch-off speed of the thyistor, such an adjustment permits to increase the pulse frequency up to the limit of the dynamic characteristics of the thyristor with a high safety margin in the operation of the thyristor.

The present invention presents the advantage over the prior art circuits of utilizing an inductance in the capacitor charge circuit as an electrical energy accumulator such as to permit controlling the charge current during the increase of voltage across the capacitor, the capacitor being discharged when it reaches a predetermined constant voltage whose level may be adjusted to be either more or less than the power supply nominal voltage. Such results are accomplished by the circuit of the invention by providing means for adjusting the supply voltage of the charge circuit such as to maintain at a predetermined value a magnitude which is a function of the current flowing through the inductance, and by providing switching means which discharge the capacitor as soon as the voltage across the capacitor reaches a predetermined level.

The novel circuit of the invention presents the remarkable advantages of providing isoenergitic electrical discharges, or discharges of equal energy, with an adjustable voltage level which may be higher than the supply voltage. The maximum frequency of the pulses, which depends upon the dynamic characteristics of the switching means, may be safely reached. The pulse voltage level is unaffected by fluctuations of the supply voltage and the pulse frequency may be adjusted independently of the pulse voltage. In circuits where the means for adjusting the average voltage of the charge circuit consists of a second switching means closing and opening at a predetermined frequency, the circuit operates with a maximum energy efficiency. The invention therefore presents all the advantages of prior art circuits as far as the increase in pulse voltage level is concerned, while maintaining the pulse voltage level at a constant predetermined value in the course of machining.

The pulse generator of the present invention has particular advantages in EDM apparatus utilizing a wire electrode continuously fed to the machining zone, which is normally subject to relatively high wear. Under such conditions, it is possible to increase the machining efficiency by providing pulses of very short duration, at a high energy level and at high frequency. In addition, because of the presence of a pulse transformer between the discharge circuit and the machining circuit, the average voltage between the electrodes during the pulse cut-off intervals is practically nil, which avoids electrolysis of the machining fluid and which even permits to use water, as a machining fluid, with all the advantages resulting therefrom.

SUMMARY OF THE INVENTION

The present invention accomplishes its object by means of a pulse generator for electrical discharge machining permitting to charge a capacitor under substantially constant current rate and to discharge the capacitor through the primary of a transformer when the voltage across the capacitor reaches a predetermined value, which utilizes an inductance connected between the power supply and the capacitor as an accumulator of electrical energy such that the voltage across the discharge circuit may be of any controllable appropriate level, and even higher than that of the power supply.

BRIEF DESCRIPTION OF THE DRAWING

The present invention will be best understood by those skilled in the art when the following description of the best mode contemplated for practicing the invention is read in conjunction with the drawing wherein:

FIG. 1 is a circuit diagram of an example of a pulse generator according to the present invention;

FIGS. 2a, 2b and 2c represent waveform diagrams useful in explaining the operation of the circuit of FIG. 1;

FIG. 3 is a modification of the circuit of FIG. 1;

FIGS. 4a–4e illustrate waveform diagrams useful in explaining the circuit of FIG. 3;

DETAILED DESCRIPTION OF THE PREFERRED EMBODIMENTS

Figure 5:
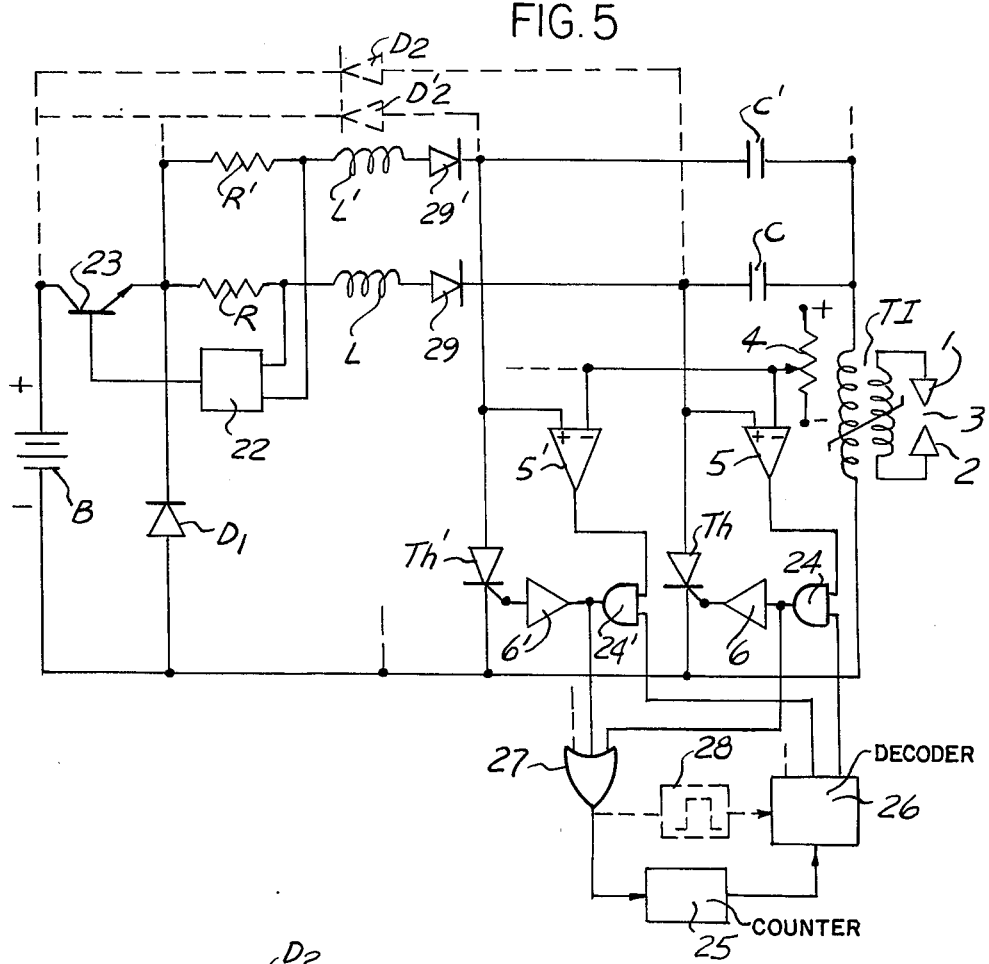
FIG. 5 represents a modification of a circuit according to the present invention.

Referring now to FIG. 1, there is illustrated a circuit diagram comprising a source B of direct current adapted to charge, through a switching means S, a capacitor C connected across the terminals of the DC power supply B through an inductance coil L, a resistor R and the primary of a pulse transformer TI. The secondary of the pulse transformer TI has one of its terminals connected to an electrode tool 1 and the other terminal connected to an electrode workpiece 2, forming therebetween a machining gap 3 through which are supplied electrical discharges when the capacitor C is discharged. The discharge circuit for the capacitor C consists of the primary winding of the transformer TI and of a thyristor Th, or an SCR, connected in series across the capacitor. The thyristor Th is controlled to conduct as soon as the voltage across the capacitor C reaches a predetermined value which is adjustable by means of a potentiometer 4 connected across a reference voltage source. For that purpose, a comparator 5 has one of its two inputs connected to the slider of the potentiometer 4 and its other input connected to an end of the capacitor C. As soon as the voltage across the capacitor C reaches a higher value than the voltage at the slider of the potentiometer 4, the comparator 5 provides an output signal which is applied through an amplifier 6 to the control electrode of the thyristor Th. The thyristor conducts, which closes the discharge circuit of the capacitor C, such that the capacitor discharges through the primary of the transformer TI, and an electrical discharge appears at the machining zone 3 between the electrodes 1 and 2.

The control of the switching means S is effected by a control circuit as a function of the charge current of the capacitor C. For that purpose, the voltage drop caused by the charging current flowing through the resistor R is applied to one of the pairs of inputs of two comparators 8 and 10. The other input of the comparators 8 and 10 are placed at a predetermined and adjustable voltage as determined by the position of the sliders of potentiometers 7 and 9, respectively, each placed across a reference voltage source. The outputs of the comparators 8 and 10 are connected to the inputs of an OR gate 12 and to the inputs of an OR gate 13, an inverter 11 being connected between the comparator 10 and the OR gate 13. The OR gate 12 and the OR gate 13 control a memory flip-flop 14 having an output $\overline{Q}$ controlling the operation of the switching means S. A diode $D_1$ is connected in shunt across the power supply B and the switching means S, for the purpose being indicated hereinafter.

In operation, each time the voltage across the capacitor C reaches a predetermined value as set by the position of the slider of the potentiometer 4, the thyristor Th is turned on and the capacitor C is discharged through the primary of the transformer TI. The voltage across the capacitor C is inverted at the end of its discharge because of the presence in the discharge circuit of the inductance of the primary winding of the transformer TI. As soon as the discharge current is reversed, the reverse flow of current across the thyristor Th causes the thyristor to be turned off. In this manner, the capacitor C begins to charge through the inductance coil L, when the switching means S is closed, from a negative voltage across the capacitor to a positive voltage, with the result that, as is well known, the capacitor C may be charged at a voltage higher than the voltage of the power supply B. The time interval during which the voltage across the capacitor is inverted is the interval $\tau$ shown in FIG. 2a. The voltage excursion across the capacitor C is represented by the waveform of FIG. 2a and such voltage varies from a maximum of $U_{C1}$, when fully charged, to a minimum having the negative value $-U_{C2}$ at the end of the discharge cycle.

The sliders of the potentiometers 7 and 9 are positioned such as to obtain at the sliders the voltages $U_{i2}$ and $U_{i1}$, respectively, corresponding to currents $i_{L2}$ and $i_{L1}$ which are represented at FIG. 2b. When the current through the resistor R is larger than $i_{L1}$, the switching means S is open, and when the current through the resistor R is smaller than $i_{L2}$, the switching means S is closed. The switching means S is closed and opened, as previously indicated, as a result of the levels 1 and O, respectively, appearing at the output $\overline{Q}$ of the flip-flop 14, as represented at FIG. 2c. As long as the switching means S remains closed, the current $I_c$ through the charge circuit of the capacitor C reaches a higher value after each charge cycle of the capacitor (FIG. 2b). However, as long as the switching means S is open, current continues to flow from the inductance L through the diode $D_1$ and charges the capacitor C until the voltage across the capacitor reaches the threshold set by the position of the slider of the potentiometer 4. However, in such a mode of operation, the current $I_c$ decreases after each charging cycle of the capacitor (FIG. 2b). The circuit of FIG. 1 operates with the limiting diode $D_2$, shown in dash line, omitted if the maximum charge voltage of the capacitor C is adjusted by way of the potentiometer 4 to a value higher than the voltage of the power supply B. Although $iL_1$ and $iL_2$ are shown at FIG. 2b as being limits for the current magnitude flowing through the inductance L represented substantially far apart for the sake of clarity, it will be readily appreciated that the difference between the two limits may controllably be made as small as desired, thereby tending towards a substantially constant current rate of charge of the capacitor C.

The schematic of FIG. 3 is slightly different from the schematic of FIG. 2, mainly with respect to the operation of the switching means S which is controlled by a detector of the duration of the time interval during which the voltage across the capacitor C is inverted. This is accomplished by means of a Schmitt trigger 15 having its input connected through a switch J, when engaged with contact a, to the terminal of the capacitor C, and having an output Q providing a voltage level for the period of time during which the voltage across the capacitor C is inverted. When that voltage is inverted, the output Q of the Schmitt trigger 15 operates simultaneously two monostable multivibrators 16 and 17. The output of the multivibrators 16 and 17 are connected to the inputs of a flip-flop 18 by way of a logic circuit comprising a NAND gate 19, an OR gate 20 and an AND gate 21. The inverted output $\overline{Q}$ of the trigger 15 controls the input $C_p$ of the flip-flop 18. When the duration of the interval $\tau$, during which the voltage across the capacitor C is negative, is longer than the duration of the interval $\tau_2$, during which the multivibrator 16 is in its unstable state, the OR gate 20 does not provide any signal to the input D of the flip-flop 18, and the inverted output $\overline{Q}$ of the flip-flop 18 controls the switching means S to its closed state (FIGS. 4a, 4b and 4d).

However, when the time interval $\tau$ becomes shorter than the time interval $\tau_1$, during which the multivibrator 17 is in its unstable state, the input D of the flip-flop 18 receives a signal and its inverted output $\overline{Q}$ provides a control signal opening the switching means S. FIGS. 4a–4e illustrate respectively the voltage across the capacitor C, the level at the output Q of the Schmitt trigger 15, the output levels respectively from the monostable multivibrators 16 and 17, and the corresponding state of the switching means S.

The circuit of FIG. 3 also permits to adjust the pulse frequency independently of the voltage level of each pulse. To that effect, the Schmitt trigger 15 is replaced by a bistable multivibrator 15a controlled, for example, by the signal at the output of the comparator 5. The time interval $\tau$ becomes equal, in such an arrangement, to the period of the pulses. In such case, the switch J is placed in its position b, rather than in the position a as illustrated at FIG. 3, to connect the input of the bistable multivibrator 15a replacing the Schmitt trigger 15 with the output of the comparator 5.

FIG. 5 represents a modification of the invention wherein several circuits similar to that illustrated at FIG. 1 are connected in parallel, two such circuits only being represented at FIG. 5. The currents flowing through those circuits are controlled by a control circuit 22 whose function is the same as that of the logic circuit controlling the switching means S of FIG. 1. The control circuit 22 controls the base of a transistor 23. The thyristor Th, or Th', is controlled by means of an AND gate 24, or 24', having an input to which is applied a voltage signal when the voltage across the capacitor C, or C', reaches a predetermined level as adjusted by the voltage reference provided by the potentiometer 4. The other input of the AND gate 24, or 24', is adapted to receive a voltage signal from the output of a periodic control circuit comprising a counter 25 followed by a decoder 26. Pulses are provided to the counter 25 from the output of an OR gate 27 having its inputs connected to the outputs of the amplifiers 6, 6'.

The circuit of FIG. 5 is capable of operating, as the previously described circuits, without the limiting diodes $D_2$, or $D_2'$. However, such limiting diodes are required if the signal from the decoder 26 is delayed by a clock 28 during an interval of time longer than the interval of time during which the capacitor C, or C', passes from its minimum voltage to its maximum voltage.

The circuit of FIG. 5 also comprises diodes 29 and 29' connected each in series in one of the charging circuits such as to eliminate interferences between the diverse charging circuits in the course of the discharge of the capacitors.

Figure 6:
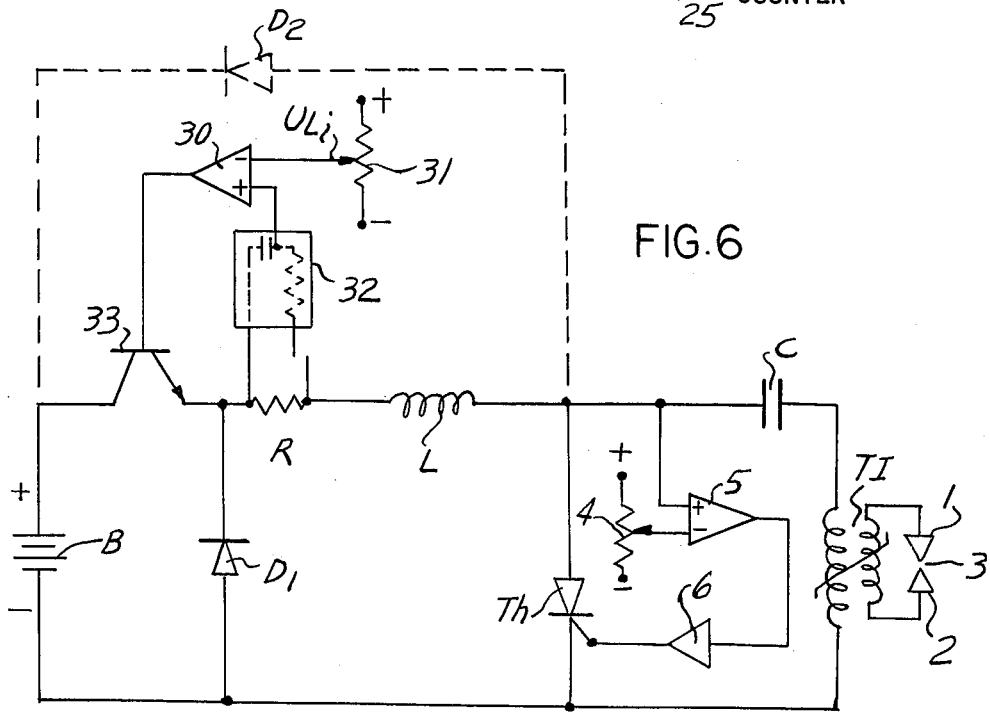
FIG. 6 represents a further variation of a circuit according to the present invention.

FIG. 6 illustrates a further modification wherein the control of the charge current supplied by the power supply B is achieved by a transistor 33 such as to adjust the charge voltage of the capacitor C. The transistor 33 is controlled by the signal at the output of a differential amplifier 30 having an input receiving a voltage $U_{Li}$ proportional to the value of the average desired current, the voltage $U_{Li}$ being obtained from a voltage divider comprising a potentiometer 31. The signal at the output of a circuit 32 for measuring the average voltage across the resistor R is applied to the other input of the differential amplifier 30.

Having thus described the present invention by way of specific practical embodiments thereof, modifications whereof will be apparent to those skilled in the art, what is claimed as new is as follows:

1. A pulse generator for electro-erosion machining apparatus for supplying controlled electrical discharge pulses between an electrode tool and an electrode workpiece, said pulse generator comprising a capacitor, a charge circuit for charging said capacitor, said charge circuit comprising a DC power supply, an inductance connected in series between said DC power supply and said capacitor, switching means for discharging said capacitor through a discharge circuit, said discharge circuit comprising a pulse transformer having a primary in said discharge circuit and a secondary connected across said electrode tool and workpiece, and means for adjusting the voltage across said charge circuit for maintaining between predetermined values the current flowing through said inductance, said switching means being closed when the voltage across said capacitor reaches a predetermined level.

2. The pulse generator of claim 1 further comprising second switching means in series between said power supply and said charge circuit, a unidirectional element shunting said charge citcuit, and means for controlling said second switching means for opening said second switching means when the current flowing through said inductance reaches a first predetermined threshold value and for closing said second switching means when said current reaches a second predetermined threshold value lower than and at most equal to said first threshold value.

3. The pulse generator of claim 1 further comprising second switching means in series between said power supply and said charge circuit, a unidirectional element shunting said charge circuit, and control means for said second switching means for opening said second switching means when the time interval during which the voltage across said capacitor remains at the same polarity is less than a predetermined threshold and for closing said second switching means when the duration of said time interval is longer than a second predetermined threshold, said second threshold higher than and at least equal to said first threshold.

4. The pulse generator of claim 1 further comprising second switching means in series between said power supply and said charge circuit, a unidirectional element shunting said charge circuit, and control means for said second switching means for opening said second switching means when the duration of the time interval between two consecutive discharges of said capacitor is less than a first predetermined threshold and for closing said second switching means when the duration of said time interval is longer than a second predetermined threshold, said second threshold being at least equal to said first threshold.

5. The pulse generator of claim 1 comprising at least a pair of parallel charge circuits, each comprising said capacitor in series with said inductance, switching means in series between said power supply and said charge circuits, a thyristor for each of said discharge circuits for discharging each said capacitor through the primary of said pulse transformer, and means for controlling each said thyristor to turn on each said thyristor upon the coincidence of the presence of a signal at the output of a clock and of the presence of a signal obtained when the voltage across each said capacitor reaches a predetermined level, said switching means being controlled as a function of the current flowing through each said inductance.

6. The pulse generator of claim 1 further comprising at least one transistor in series between said power supply and said charge circuit, and control means for said transistor for maintaining the current flowing through said inductance at a predetermined value.

* * * * *